(12) United States Patent
Jouhikainen et al.

(10) Patent No.: US 11,610,387 B2
(45) Date of Patent: Mar. 21, 2023

(54) SYSTEMS AND METHODS FOR AUTOMATED OBJECT RECOGNITION

(71) Applicant: Capital One Services, LLC, McLean, VA (US)

(72) Inventors: Hannes Mikael Jouhikainen, McLean, VA (US); Drew Jacobs, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 124 days.

(21) Appl. No.: 17/175,271

(22) Filed: Feb. 12, 2021

(65) Prior Publication Data
US 2021/0166054 A1 Jun. 3, 2021

Related U.S. Application Data

(63) Continuation of application No. 16/656,006, filed on Oct. 17, 2019, now Pat. No. 10,936,898, which is a
(Continued)

(51) Int. Cl.
*G06V 10/44* (2022.01)
*G06T 7/11* (2017.01)
(Continued)

(52) U.S. Cl.
CPC ............. *G06V 10/443* (2022.01); *G06N 3/08* (2013.01); *G06N 20/00* (2019.01); *G06T 7/11* (2017.01);
(Continued)

(58) Field of Classification Search
CPC ........ G06V 10/443; G06T 7/11; G06N 20/00; G06N 20/20; G06N 3/08; H04N 21/23418
See application file for complete search history.

(56) References Cited

U.S. PATENT DOCUMENTS 10,346,723 B2 * 7/2019 Han ..................... G06K 9/6256
10,482,345 B2 * 11/2019 Jouhikainen ............. G06T 7/11
(Continued)

*Primary Examiner* — Mia M Thomas
(74) *Attorney, Agent, or Firm* — Perkins Coie LLP

(57) ABSTRACT

A method for recognizing an object in a video stream may include receiving a video stream from a video source, the video stream comprising a plurality of video frames. The method may also include selecting at least one video frame from the video frames according to a frame selection rate. The method may also include partitioning the selected video frame into a first plurality of image blocks. The method may also include recognizing, out of the first plurality of image blocks, a second plurality of image blocks which comprise an image of an object, the recognition being based on an image recognition parameter determined by a machine-learning algorithm. The method may also include determining that at least one of the second plurality of image blocks corresponds to the object based on a likelihood metric, the likelihood metric being determined by the processor based on at least the frame selection rate. The method may further include displaying, on a display, information identifying the object. A system and non-transitory computer-readable medium may also be provided.

20 Claims, 9 Drawing Sheets

Related U.S. Application Data continuation of application No. 15/630,913, filed on Jun. 22, 2017, now Pat. No. 10,482,345.

(60) Provisional application No. 62/354,059, filed on Jun. 23, 2016.

(51) Int. Cl.

| | | |
|---|---|---|
| *H04N 21/234* | (2011.01) | |
| *H04N 21/81* | (2011.01) | |
| *H04N 21/44* | (2011.01) | |
| *H04N 21/478* | (2011.01) | |
| *G06V 20/20* | (2022.01) | |
| *G06N 20/00* | (2019.01) | |
| *G06N 3/08* | (2023.01) | |

(52) U.S. Cl.
CPC ....... *G06V 20/20* (2022.01); *H04N 21/23418* (2013.01); *H04N 21/44008* (2013.01); *H04N 21/47815* (2013.01); *H04N 21/812* (2013.01); *G06T 2207/10016* (2013.01)

(56) References Cited

U.S. PATENT DOCUMENTS

| | | | | |
|---|---|---|---|---|
| 10,880,551 | B2* | 12/2020 | Topiwala | G06N 3/082 |
| 10,936,898 | B2* | 3/2021 | Jouhikainen | G06V 10/443 |
| 2013/0182182 | A1* | 7/2013 | Mountain | H04N 21/44008 |
| | | | | 348/E5.103 |
| 2015/0332127 | A1* | 11/2015 | Zheng | G06K 9/6298 |
| | | | | 382/165 |
| 2017/0255827 | A1* | 9/2017 | Chang | H04N 21/251 |
| 2017/0339409 | A1* | 11/2017 | Socek | H04N 19/167 |
| 2017/0372165 | A1* | 12/2017 | Jouhikainen | G06V 10/443 |
| 2018/0284757 | A1* | 10/2018 | Celia | G05B 23/0289 |
| 2020/0311945 | A1* | 10/2020 | Lim | G06T 7/11 |

* cited by examiner

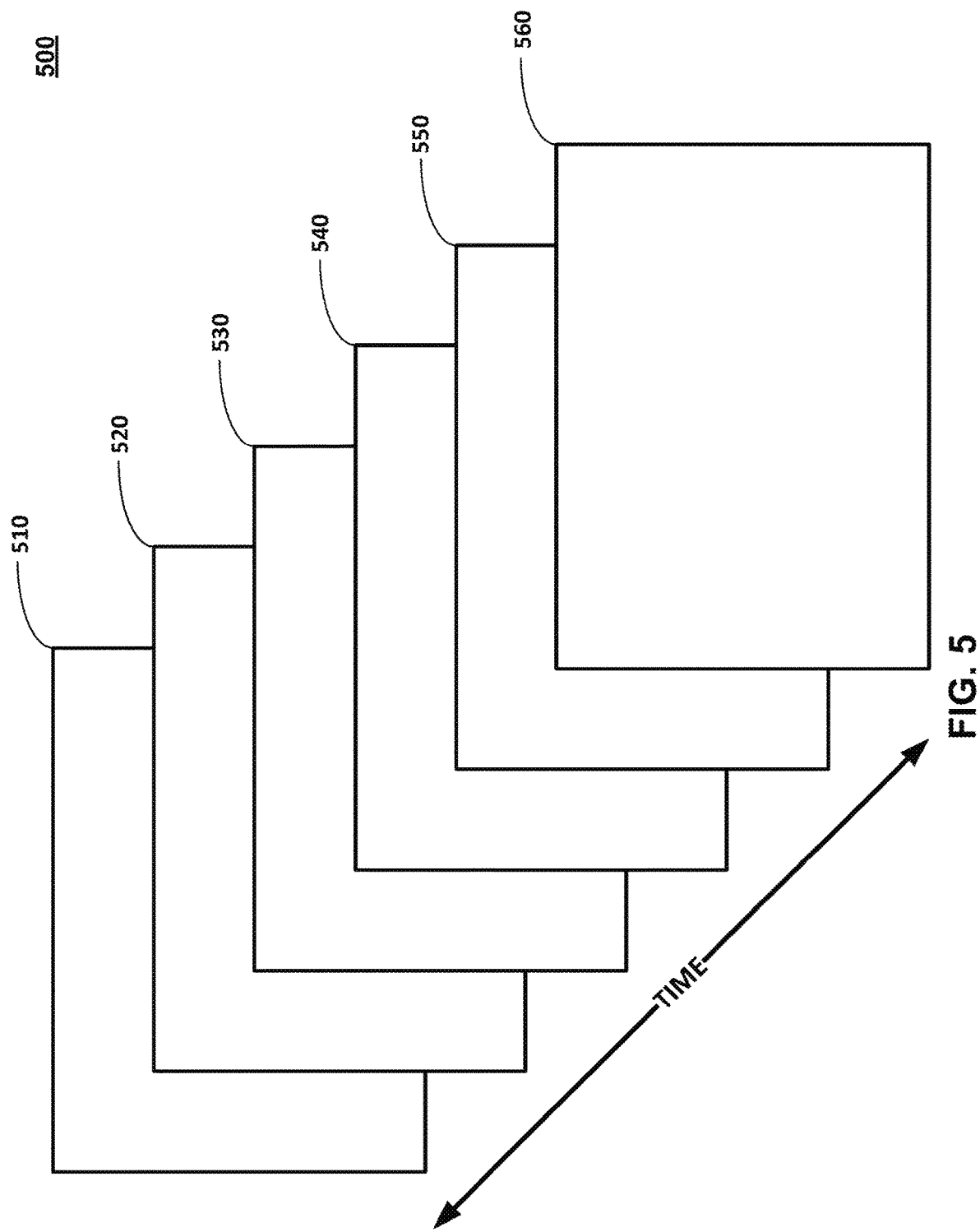

SYSTEMS AND METHODS FOR AUTOMATED OBJECT RECOGNITION

CROSS-REFERENCE TO RELATED APPLICATIONS

This application is a continuation of U.S. patent application Ser. No. 16/656,006, filed Oct. 17, 2019, which is a continuation of U.S. patent application Ser. No. 15/630,913, filed Jun. 22, 2017, which claims priority from U.S. Provisional Patent Application No. 62/354,059, filed on Jun. 23, 2016, the entire disclosure of which applications is incorporated by reference in the present application.

TECHNICAL FIELD

The present disclosure generally relates to computer vision and, more particularly, to machine recognition and identification of a specific object shown in video or image content.

BACKGROUND

Video and image content often contains numerous objects that are visible to a viewer. Although a human viewer may perceive the objects shown in the video or image content with little effort, it is no easy task for a machine or computer to recognize and identify the objects. Moreover, objects in a video, that is, an image stream, may constantly change, move, appear, disappear, etc. As such, computerized object recognition in a continuous video/image stream often requires a tremendous amount of computation power. This task is a challenge for many user devices (e.g., smart TVs, personal computers, smart phones) that have limited computing resources.

Moreover, it is often desirable to know and use information related to the objects shown in the video or image content. For example, although a human viewer can easily determine that an object currently shown on a TV screen is a car, the viewer still does not know the maker, year, price of the car, or which dealer around the neighborhood currently carries in its inventory the car in the depicted color. As another example, video content may include the clothing that certain people are wearing, electronics that they are using, and cars that they are driving. A viewer may be inclined to purchase such objects (i.e., products) or at least learn more information about them. The viewer may, however, be unable to identify the products or know where to purchase such products. The viewer may also not know price information about the products.

Current content delivery systems, such as Netflix, Apple TV, and Amazon Prime provide streaming video content, but do not include any recognition or identification of products that are present in the video content Thus, as discussed above, while a viewer may desire to purchase or learn more about a product shown in the video content, current content delivery systems do not offer a means for the viewer to learn any information about the product. Moreover, brands and merchants cannot use the current content delivery systems to make potential sales to such a viewer.

Similar issues may exist in regard to digital images that are present in digital photo galleries, which may be located on social media websites or other internet web pages. While these images may include numerous products that the viewer is interested in purchasing or learning about, a viewer may not know how or where to purchase the item, and may not know any other information about the product, such as its brand, or how much it costs.

In view of the shortcomings of current systems, systems and methods for automated object recognition are desired.

SUMMARY

Disclosed embodiments provide systems and methods for automated recognition of objects that are present in video and image content.

Consistent with a disclosed embodiment, systems for recognizing an object in a video stream are provided. A system for recognizing an object in a video stream may include a memory storing instructions and a processor configured to execute the stored instructions to perform operations. The operations may include: receiving a video stream from a video source, the video stream comprising a plurality of video frames; selecting at least one video frame from the video frames according to a frame selection rate; partitioning the selected video frame into a first plurality of image blocks; recognizing, out of the first plurality of image blocks, a second plurality of image blocks which comprise an image of an object, the recognition being based on an image recognition parameter determined by a machine-learning algorithm; determining that at least one of the second plurality of image blocks corresponds to the object based on a likelihood metric, the likelihood metric being determined by the processor based on at least the frame selection rate; and displaying, on a display, information identifying the object.

Consistent with disclosed embodiments, methods for recognizing an object in a video stream are provided.

Consistent with disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 5 is a schematic diagram showing a frame selection rate consistent with disclosed embodiments.

DESCRIPTION OF THE EMBODIMENTS

The disclosed embodiments include systems and methods for the automated recognition of objects that are present in video and/or image content. In particular, the disclosed systems and methods may be used in a visual-content delivery system and enable the visual-content delivery system to automatically recognize objects presented by the visual content and provide information related to the recognized objects. For example, in some embodiments, a video stream including a plurality of video frames may be received from a video source. At least one video frame of the plurality of video frames may be selected according to a frame selection rate. A selected video frame may be partitioned into a first plurality of image blocks. A region within the first plurality of image blocks may be recognized using at least one image recognition parameter. The region may include a second plurality of image blocks. It may be determined that the second plurality of image blocks corresponds to an object based on a likelihood metric. The likelihood metric may be determined based on at least the frame selection rate. Information identifying the object may be displayed to a viewer on a display device.

As used in the present disclosure, "object" refers to any thing or person that is shown in a video or image sequence and is of interest to a viewer of the video or image. For illustrative purpose only, the following description assumes the objects to be recognized are products, e.g., clothing, electronic gadgets, cars, home appliances, etc., that a viewer may be interested to purchase and learn more about.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
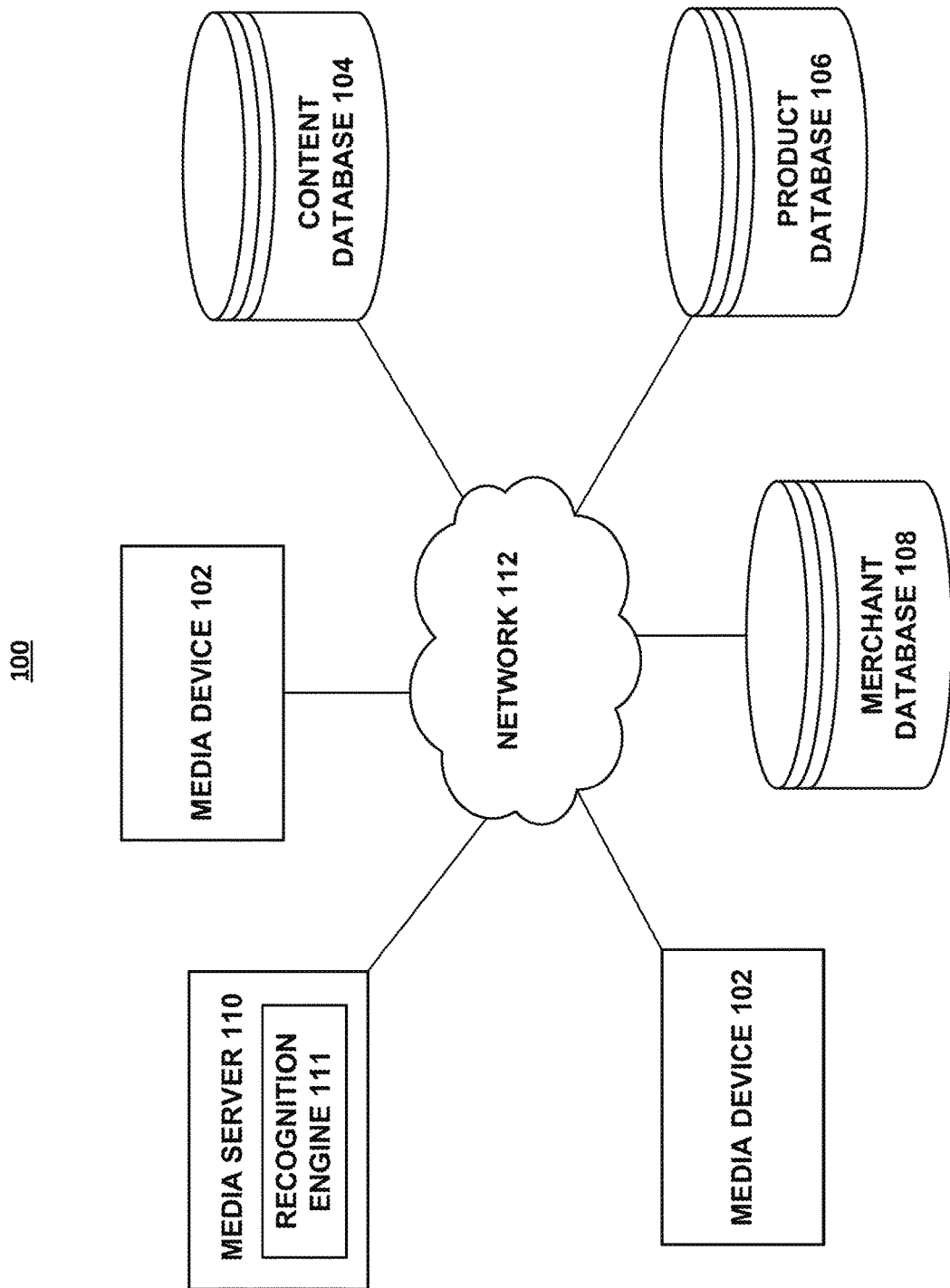
FIG. 1 is a diagram of an exemplary system consistent with disclosed embodiments.

FIG. 1 is a diagram of an exemplary system 100 consistent with disclosed embodiments. System 100 may include a media device 102, a content database 104, a product database 106, a merchant database 108, a media server 110, and a network 112. The components and arrangement of the components included in system 100 may vary. Thus, system 100 may further include other components or devices that perform or assist in the performance of one or more processes consistent with tile disclosed embodiments. The components and arrangements shown in FIG. 1 are not intended to limit the disclosed embodiments, as the components used to implement the disclosed processes and features may vary. For example, although one media device 102 is depicted, consistent with some embodiments, more than one media device 102 may be included in system 100.

Media device 102 may be a tablet, smartphone, personal computer, laptop computer, or the like, which is capable of streaming video or image content, or receiving video or image content, and displaying such content for viewing. Media device 102 may alternatively be a set-top box, game console, media center, cable box, satellite receiver, or any other media device capable of streaming video or image content or receiving video or image content, and providing such content to a display device for viewing. A display device may be a television display, flat-panel monitor, or the like.

Media device 102 may receive a stream of video or image content from content database 104. The video stream may include a plurality of video frames, and the video stream may be in any video format and definition known in the art. For example, the video stream may be coded according to the H.264 Advanced video coding (AVC) standard, or the H.265 High Efficiency video coding standard (HEVC). The video stream may be in standard definition or high definition, 4K or 8K ultra high definition formats, or any other format.

Figure 2:
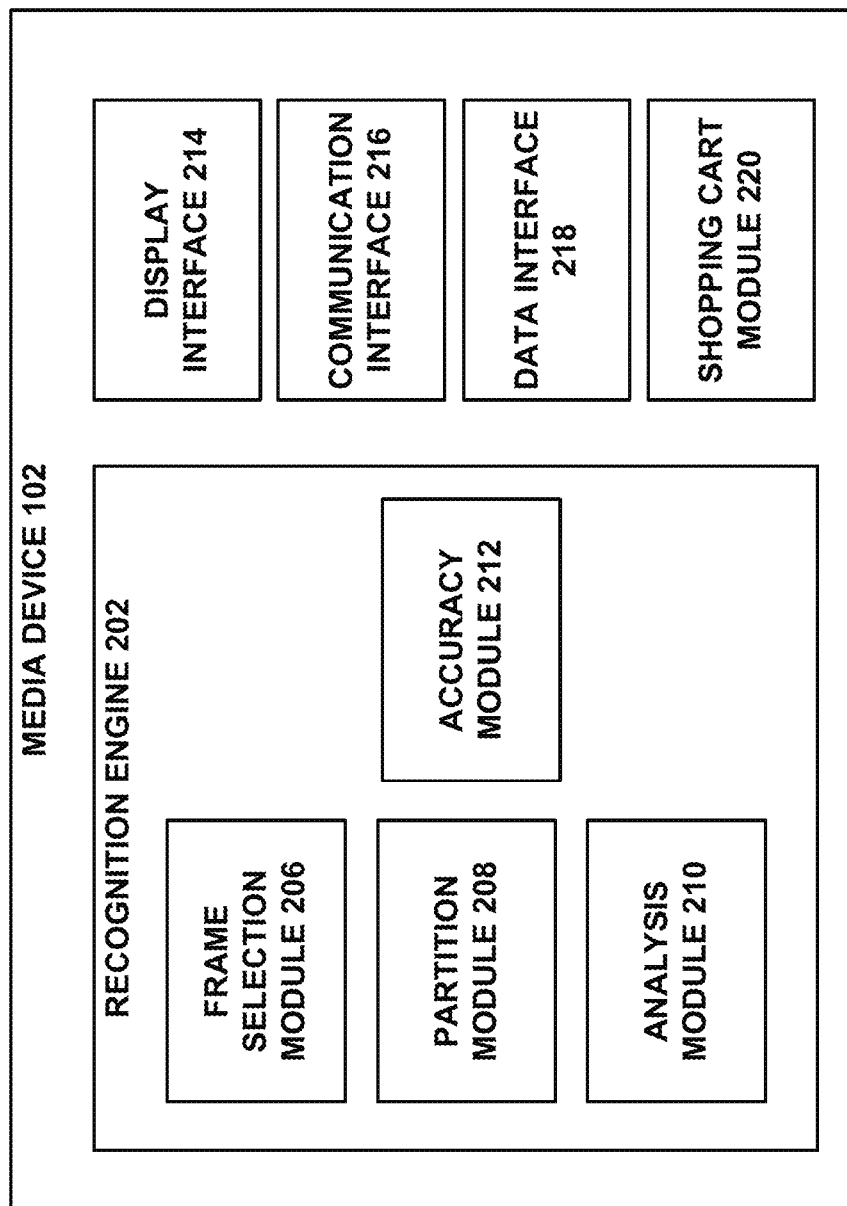
FIG. 2 is a diagram of recognition engine, consistent with disclosed embodiments.

Media device 102 may include a recognition engine 202 (FIG. 2). Recognition engine 202 may analyze a video stream provided by content source database 104 to recognize a product located in a video frame of the video stream. Recognition engine 202 may analyze image and video content according to at least one machine-learning algorithm. The learning machine-algorithm may use and adjust at least one parameter or parameter set. More parameters may be added to the machine-learning algorithm as more content is analyzed and/or as different types of content are analyzed. The parameters in a parameter set may be weighted, and weightings of the parameters may be adjusted. In some embodiments, the machine-learning algorithm may be a deep-learning algorithm that provides layered neural network analysis. In some embodiments, the machine-learning algorithm may be a video and/or image recognition algorithm. The analysis provided by recognition engine 202 will be discussed in relation to FIG. 2.

Once a product is recognized, the recognized product may be automatically placed in a digital shopping cart or other kind of list. For example, once a product is recognized, information about the product may be requested and collected from product database 106, and such information may be used to populate a digital shopping cart or list. The digital shopping cart may be displayed by media device 102, and may include information about the recognized product, such as the product name, price, and availability (from internet merchants, and/or brick and mortar store merchants). The digital shopping cart may also display products similar to the recognized product, and recommend other products that are related to the recognized product. The digital shopping cart may enable a viewer to select items for purchase, complete a purchase, cancel a purchase, and/or save a product in the digital shopping cart.

Content database 104 may store video and/or image content. For example, content database 104 may be a video and image repository that includes different video and image content The content may have a variety of different formats and quality definitions. The content of content database 104 may be periodically updated. For example, the content of content database 104 may be updated by changing or removing existing content in database 104, and/or adding new video/image content to database 104. Alternatively, content may be added or removed, in response to a preset schedule, or on demand based on a command by a user. Content database 104 may additionally store audio content corresponding to the video and image content. The audio content and corresponding video content may be sent in a single video stream to media device 102 and/or media server 110 for streaming or for storing.

Product database 106 may store data about products. Such data may include, for example, price, descriptive information, brand, merchants, availability, and the like. Product database 106 may receive and/or transmit data to other databases, such as merchant database 108, and may use data gathered from merchant database 108 to build an inventory for each product. For example, product database 106 may store data regarding the price of a product at a merchant associated with merchant database 108, and the quantity of the product for sale at a merchant associated with merchant database 108. Data that is stored in product database 106 may be "scraped" from websites on the Internet and/or product catalogues, and may include data that describe a product. The data may be scraped from any public data source, and may be scraped from a private data source when authorization from the private source is provided. When a product is successfully recognized by recognition analysis, data from product database 106 may be provided to the media device 102 and/or media server 110. The data may be displayed by media device 102 and/or media server 110, or otherwise associated with the recognized product. Consistent with the disclosed embodiments, one or more product databases 106 may be provided in system 100. In one embodiment, product data may be aggregated from a plurality of product data servers 106 and provided to media device 102 and/or media server 110. Media device 102 and media server 110 may receive such product data for further usage.

Merchant database 108 may include merchant data regarding products. For example, merchant database 108 may include data regarding merchant stock, price, and discounts regarding products. Moreover, merchant database 108 may include data indicating accepted payment methods for purchasing products, online store's uniform resource locators (URLs), and brick-and-mortar store locations. In addition to receiving data from product databases 106, media device 102 and/or media server 110 may also receive data from merchant database 108.

Media server 110 may provide analysis of image and video content according to at least one machine-learning algorithm. For example, media server 110 may include a recognition engine 111 that performs the same functions as recognition engine 202. Thus, recognition engine 111 may, as discussed above in regard to recognition engine 202, analyze a video stream provided by content database 104 to recognize a product shown in a video frame of the video stream. However, recognition engine 111 may also perform additional functions. For example, recognition engine 111 may collect information from media devices 102 indicating how often products are incorrectly recognized, which products are correctly recognized, and which frame selection rates are effective and/or optimal for analyzing video content. Based on the collected information, media server 110 may provide updates to the media devices 102 (i.e., recognition engines 202) via network 112, such that media devices 102 may adjust their recognition analysis based on the updates. For example, the updates may adjust one or more frame selection rates, at least one parameter of at least one machine-learning algorithm, a likelihood metric, a predetermined threshold, and the like. The updates may also adjust the processes that determine whether regions of a video frame correspond to a product. In some embodiments, each update may correspond to analysis of one or more video or image content titles, kinds, formats, and any other category of content. That is, different updates may be provided for and used on analyzing different categories or types of video/image content.

It should be noted that recognition engine 202 of media device 102 may also perform the additional functions discussed above in regard to recognition engine 111 in some embodiments. In some embodiments, recognition engine 202 of media device 102 may collect information from other media devices and/or media servers as to how often products are incorrectly recognized, which products are correctly recognized, and which frame selection rates are effective and/or optimal for analyzing video content. Recognition engine 202 may then update its recognition analysis to adjust one or more frame selection rates, at least one parameter, a likelihood metric, a predetermined threshold, and the like. The updates may also adjust the processes that determine whether regions of a video frame correspond to a product. Each update may correspond to analysis of one or more video and image content titles, kinds, formats, and any other category of content.

Media server 110 may also perform the same functions that media device 102 performs. Media device 102 will be described in more detail in relation to FIG. 2.

Network 112, in some embodiments, may comprise one or more interconnected wired or wireless data networks that receive data from one component (e.g., content database 104) and send it to another device (e.g., media device 102). For example, network 112 may be implemented as the Internet, a wired Wide Area Network (WAN), a wired Local Area Network (LAN), a wireless LAN (e.g., IEEE 802.11, Bluetooth® (see https://www.bluetooth.com/), etc.), a wireless WAN (e.g., WiMAX), a public switched telephone network (PSTN), an Integrated Services Digital Network (ISDN), an infrared (IR) link, a radio link, such as a Universal Mobile Telecommunications System (UMTS), Global System for Mobile Communications (GSM), Code Division Multiple Access (CDMA), broadcast radio network, cable television network, a satellite link, and the like.

It should be noted that one or more of media devices 102, content database 104, product database 106, merchant database 108, media server 110, and network 112 may be provided in system 100, as well as additional components or fewer components.

FIG. 2 is a diagram of media device 102, consistent with disclosed embodiments. Media device 102 may include recognition engine 202. Recognition engine 202 may include a frame selection module 206, a partition module 208, an analysis module 210, and an accuracy module 212. Media device 102 may also include a display interface 214, a communication interface 216, a data interface 218, and a shopping cart module 220.

Media device 102 may receive video and/or image content, which may be in the form of a video and/or image stream that contains video and/or image frames. The frames may be provided to recognition engine 202. Frame selection module 206 may select one or more of the frames for recognition analysis. For example, frame selection module 206 may select one or more video frames of the plurality of video frames in a video stream according to a frame selection rate. The frame selection rate dictates how often a video frame is selected from a video stream for product recognition analysis. For example, frame selection module 206 may select every video frame of the video stream for recognition analysis, every other frame for recognition analysis, one out of every three frames for recognition analysis, one out of every thousand frames for recognition analysis, and so on.

A likelihood metric is used to measure the probability of whether recognition of a product in a video frame is accurate. The likelihood metric may be higher when the frame selection rate is higher. For example, the likelihood metric achieved when a high number, e.g., all of the video frames, or more than a threshold amount (e.g., 90 percent) of video frames of the video stream is selected for recognition analysis may be higher than the likelihood metric achieved when only one out of every five hundred video frames is selected for recognition analysis. This is because when a higher number of video frames are selected for analysis, more processing is needed to recognize products from more frames. However, a lower frame selection rate indicates that a more economical recognition analysis takes place, which may improve computational speed and efficiency.

The frame selection rate may be changed, i.e., increased or decreased. In one embodiment, frame selection module 206 may change the frame selection rate according to an input provided by a viewer via an external user device. For example, a viewer may watch video content received or streamed by media device 102, and recognition engine 202 may initially perform a recognition analysis according to a first frame selection rate. However, the viewer may determine that the recognition analysis according to the first frame selection rate is incorrect. For example, the products recognized by recognition engine 202 may not correspond to the actual products, or recognition engine 202 fails to recognize products that should be recognized, and the like. Thus, the viewer may provide an input to media device i 02 via communication interface 216, indicating that the frame selection rate should be increased. Frame selection module 206 may then increase the frame selection rate. This way, recognition engine 202 may analyze an increased number of video frames of the video stream, such that a likelihood metric for a region in a video frame will increase. Frame selection module 206 may alternatively decrease the frame selection rate according to an input to media device 102 via communication interface 216, for example, when the viewer determines the recognition analysis is correct and the current frame selection rate may be reduced.

In another embodiment, frame selection module 206 may change the frame selection rate automatically according to accuracy analysis performed by accuracy module 212. For example, accuracy module 212 may analyze whether products are being recognized in video frames. Accuracy module 212 may determine whether video quality is too low for accurate analysis recognition, or may determine that the viewable angle or location of a product in a video frame does not allow for accurate recognition. Accuracy module 212 may also determine whether data parameter(s) that are used to recognize regions within a video frame are accurate and provide correct region recognition. As described in more detail below, accuracy module 212 may also analyze the amount of processing being performed by recognition engine 202, and whether adjusting a frame selection rate, providing different partitioning of a video frame, and/or using adjusted or different learned data parameter(s), for example, may improve computational efficiency while maintaining accurate recognition results. Based on the determinations, accuracy module 212 may determine, for example, that the frame selection rate should be adjusted, that partitions of video frames should be changed, and/or that data parameter(s) should be changed. Adjustments provided by accuracy module 212 may be categorized according to video/image content type, content format, content quality, content definition, content title, content category, and the like.

Partition module 208 may be configured to partition an input video or image frame into a number of image blocks. Each of the image blocks may contain a number of pixels. For example, partition module 208 may partition a video frame into a plurality of blocks. The blocks may be sized at a variety of different sizes, such as 16×16 pixels, 32×32 pixels, 32×16 pixels, and the like. The partitions may be any appropriate size, as known in the art Alternatively, partition module 208 may not partition the video frame into any blocks, i.e., keeping the entire video frame as one image block. Partition module 208 may adjust the partitions of video frames. Partition module 208 may apply the adjustments to all video frames, a majority of video frames, certain video frames, certain types of content, certain content formats and definitions, and the like. The frame partitions are adjusted for improving the accuracy of product recognition and based on analysis by accuracy module 212.

Analysis module 210 may receive a video frame from partition module 208. Analysis module 210 may analyze the video frame to recognize one or more regions of the video frame and recognize one or more products shown in a video frame. Analysis module 210 may use at least one machine-learning algorithm that uses at least one parameter. Analysis module 210 may receive the parameter from recognition engines 202 of other media devices 102 and/or from recognition engines 111 of one or more of media servers 110.

The parameter may be member of a parameter set used by the at least one machine-learning algorithm. The parameter set may include a plurality of parameters, thus forming a vector of parameters. The machine-learning algorithm using a parameter or parameter set may recognize products that are present in video content The machine-learning algorithm may detect edges, patterns, colors, features, writing, shapes, and any other kind of descriptive elements that may be exhibited by products in video content, and may be used to recognize such descriptive elements that are present in video content.

The parameters may also be determined via information collected from product database 106. For example, product information from product database 106 may be used to determine characteristics about products, and the parameters may reflect these determined characteristics.

The parameters may be applied to video frames via at least one machine-learning algorithm. Analysis module 210 may adjust the parameters as more video frames are analyzed. Analysis module 210 may make the adjustments based on error calculations that determine whether the machine-learning algorithm using the parameter is accurately detecting products in the content. Analysis module 210 may continuously revise and update the to provide improved recognition as more varied types of descriptive elements and video/image content are analyzed.

For example, a machine-learning algorithm using a set of parameters may be configured to detect a shape in a video frame. Tile algorithm may analyze a video frame to detect a shape, but may encounter a shape that has not been analyzed before. As such, analysis module 210 may adjust or revise the set of parameters, or add additional parameters to the algorithm, based on analysis of the new shape, to provide improved recognition in future-received video frames. Thereafter, when this new shape is present in future-received video frames, it will be better recognized by the machine-learning algorithm with the adjusted (and/or revised and/or added) parameter set.

A parameter and/or set of parameters may be received from at least one other media device 102 and/or at least one media server 110. For example, analysis module 210 may receive information from at least one other media device 102 and/or media server 110 that indicates the value that a parameter should have for optimal product recognition. Such received information may be feedback data that refines at least one parameter, and may indicate how parameters of a machine-learning algorithm should be weighted. Analysis module 210 may use such feedback to refine parameters and/or parameter sets. Analysis module 210 may also further adjust parameters in relation to analyzed content, and may provide adjusted parameters to one or more other media devices i 02 and/or medias server 110 as feedback data. Thus, analysis module 210 may both use parameters that are learned by other media devices 102 and/or media servers 110 to recognize products in a video frame, and also provide data parameters based on its own learning to other media devices 102 and/or media servers 110.

Data parameters may be specific to certain video and/or image content, titles, formats, quality, definitions, standards, and the like. Data may alternatively be configured for general use for varying kinds of video and images.

Analysis module 210 may analyze image and video content according to at least one machine-learning algorithm to recognize regions of a video frame. A region of a video frame may include a plurality of image blocks or a single image block. As such, analysis module 2i0 may recognize multiple regions in a video frame, or a single region in a video frame.

Analysis module 210 may recognize a first region within a selected video frame by using at least one machine-learning algorithm. The first region may include a single image block or a plurality of image blocks. Analysis module 210 may recognize the first region as follows. Analysis module 210 may run the machine-learning algorithm to detect features that are present in a video frame, such as edges, colors, and shapes, for example. Analysis module 210 may determine the region(s) of the frame where these features are located. Analysis module 210 may also determine a feature metric for a region of the frame. The feature metric may correspond to the number of features that are present in the region. Analysis module 210 may also determine a feature threshold. Analysis module 210 may recognize a region as a first region by comparing the feature metric of that region to the feature threshold. If the feature metric equals or exceeds the feature threshold, analysis module 210 identifies the region as being the first region, and determines that a product may exist in the first region. If the feature metric is less than the feature threshold, analysis module 210 determines that the region is not the first region, and continues to compare feature metrics of other regions of the video frame to the feature threshold. The size of the first region may depend on features that are present inside it. For example, the first region may include features that are present within it, as well as a buffer zone of image blocks that form a perimeter around the features in the first region. In another example, the perimeter of the first region may be set as a predetermined distance from the center of the first region. In another example, the perimeter of the first region may be set as a predetermined distance from a feature of the first region.

Once the first region is recognized, analysis module 210 may determine whether a product is accurately recognized from the first region. Analysis module 210 may make the determination by determining a first likelihood metric of image block(s) that are present in the first region, and comparing the first likelihood metric to a predetermined threshold. Analysis module 210 may determine the first likelihood metric based on information (e.g., product information, merchant information) determined about the potential product in the first region, and an error rate of the at least one analysis algorithm. Analysis module 2i0 may also determine the first likelihood metric based on the frame selection rate. If the first likelihood metric is greater than or equal to a predetermined threshold, then analysis module 210 deems the product to be accurately recognized, and shopping cart module 220 may populate a digital shopping cart and/or list of recognized products of the video content. However, if the first likelihood metric is less than the predetermined threshold, then analysis module 210 may perform further analysis of the frame to recognize the product. In particular, when the first likelihood metric is less than the predetermined threshold, frame selection module 206 may adjust the frame selection rate. For example, when the first likelihood metric is less than the predetermined threshold, frame selection module 206 may increase the frame selection rate, such that more frames are analyzed by analysis module 210.

Recognizing the first region may reduce the area of the video frame that is analyzed, and may thereby reduce computational power that is required in the processing performed by analysis module 210. For example, recognition of the first region may be an initial "rough" processing of the video frame that narrows down the region(s) of the video frame where a product (or products) may be located. Thereafter, further processing and analysis of the first region may be performed to recognize a first product.

To further process the first region of the video frame, analysis module 210 may use at least one machine-learning algorithm to analyze the first region. The machine-learning algorithm used for analyzing the first region may be the same as that applied to the video frame to recognize the first region, or may be different. Moreover, the parameters used for analyzing the first region may be the same as those used for recognizing the first region, or may be different. By performing this further analysis, analysis module 210 may further recognize a section within the first region. The section may include one image block or a plurality of image blocks. Analysis module 210 may recognize the section of the first region in a manner similar to that described above for determining the first region.

Once the section is recognized, analysis module 210 may determine whether a product is accurately recognized from the section. Specifically, analysis module 210 may make the determination by determining a second likelihood metric of image block(s) that are present in the section, and comparing the second likelihood metric to a predetermined threshold. Similar to the first likelihood metric, analysis module 210 may determine the second likelihood metric based on information (e.g., product information, merchant information) determined about the potential product in the section, and an error rate of the image recognition algorithms. Analysis module 210 may also determine tile second likelihood metric based on the frame selection rate. If the second likelihood metric is greater than or equal to a predetermined threshold, then analysis module 210 may deem the product to be accurately recognized, and shopping cart module 220 may thereby use the product to populate a shopping cart and/or list of recognized products of the video content. If the second likelihood metric is less than tile predetermined threshold, then analysis module 210 will perform further analysis to recognize the product, in a manner similar to that described above. Analysis module 210 may continue the analysis in iterations until the second likelihood metric reaches or exceeds the predetermined threshold.

Analysis module 210 may alternatively and/or in addition use image matching to recognize a product that is present in a video frame. Image matching may include comparing at least one image block of a video frame to a stored image block, where the stored image block is representative of a product. A stored image block may be stored in product database 106 and/or merchant database 108.

Analysis module 210 may also use audio content received along with image and/or video content from content database 104 to recognize products in video frames. For example, in addition to analyzing video frame data to recognize a product, analysis module 210 may also analyze audio data to determine which products are located in a video and/or image frame.

For example, audio content may include speech, music, and/or sound data that corresponds to one or more products that are located in an image or video frame. Analysis module 210 may use speech recognition techniques to determine from the audio content that a certain product is present in the image or video frame. Accordingly, after such detection, analysis module 210 may adjust one or more of the learned parameters to weigh in favor of recognizing such a product. For example, if audio content indicates that a basketball is present in a video frame, analysis module 210 may weigh at least one parameter to recognize round or spherical objects and/or objects that are orange in color (since basketballs are usually orange) from the image or video frame.

Analysis module 210 may also use such audio analysis to refine product recognition. For example, if a recognized region has an associated likelihood metric, such audio analysis may analyze the associated audio content to confirm that a product in the region is accurately recognized. Such audio content analysis helps improve a first and/or second likelihood metrics of image blocks in a recognized region.

For each video/image content title, analysis module 210 may generate a title profile.

A title profile may include some or all of the products that are recognized from a video/image content of the content title. For example, video content for a content title may include fifteen recognized products. Each product may be populated on a title profile for that respective content title. Accordingly, when a video and/or image content title has already been analyzed by an analysis module 210 and is streamed, analysis module 210 may use title profile information associated with the title to populate a shopping cart rather than performing recognition analysis on the content. Alternatively, analysis module 210 may perform recognition analysis to further recognize products that may not have been recognized in previous analysis. Moreover, a viewer may review and browse the products that have been recognized in a title and stored in the associated title profile. A viewer may review and browse the products stored in a title profile while viewing the corresponding title, or without viewing the corresponding title.

Analysis module 210 may further make suggestions of video and/or image content that a viewer may be interested in. For example, based on the types of products that a viewer is interested in (as determined based on, for example, a viewer's transaction data regarding previously purchased products, internet web-browsing history, social media data, email/instant messaging conversation data, and the like), analysis module 210 may determine that a viewer may be interested in a certain genre or type of content, or content that features certain actors and characters. Analysis module 210 may therefore provide suggestions to a viewer via display interface 214 regarding such suggestions.

Display interface 214 may be any appropriate interface that provides video and/or image stream data, including the video/image frames analyzed by recognition engine 202, to an external display, such as a television display, computer display, monitor, touchscreen display, or the like. Alternatively, display interface 214 may be a display itself that displays the video and/or image stream data, including the video/image frames analyzed by recognition engine 202, and may accordingly be a touchscreen display, surface display, or any other kind of display.

Communication interface 216 may be an interface that allows for the reception of inputs from a viewer or user. For example, communication interface 216 may be an interface that receives input from an external user device via a wireless or wired connection. For example, communication interface 216 may be configured to communicate via WiFi, Bluetooth®, infrared connectivity, or the like with an external user device. Communication interface 216 may allow a viewer or user to provide command inputs to media device 102 from an external user device. For example, communication interface 216 may provide the interface needed to receive frame selection rate feedback from a viewer's external user device when a viewer wishes to adjust the frame selection rate, and does so by inputting a command into the external user device. Communication interface 216 may provide the interface needed to receive an input from a viewer's external user device indicating a selection of a product in a shopping cart, a selection to purchase a product from the shopping cart, and any other selections interactions that a viewer wishes to make with video/image content. Communication interface 216 may also provide such features via a wired connection to an external user device. Alternatively, when display interface 214 is a touchscreen, communication interface 216 may be configured to interpret inputs received via display interface 214 and make the selections or interactions specified by such inputs.

An external user device may be a smart phone, mobile phone, cell phone, tablet, computer, laptop computer, personal computer, smart watch, remote control device, and tile like.

Communication interface 216 may allow for user input that corrects recognition provided by analysis module 210. For example, a product may be recognized by analysis module 210, but the recognition may be erroneous. Accordingly, communication interface 216 may allow a viewer to provide an input (from an external user device, or any kind of input device, such as a mouse, keyboard, etc.) to identify a region of a video frame that includes a product, and specify what the product is. For example, a user may use a pointer on a display showing video content to draw an outline of a specific product in a video frame or tag a specific product in a video frame, may input a description of the outlined product, and/or may link a website address (for example, a URL) to the product description. The website located at the website address may specify further details about the product, and media device 102 and/or media server 110 may retrieve the details from the website. Data reflecting such corrections to product recognition may be aggregated from one or more media devices 102 and/or media servers 110, and may be used by media device 102 and/or media server 110 to learn about the corrected product, and to update or train a parameter or set of parameters used by the machine-learning algorithm for recognizing the product.

Data interface 218 may be configured to interact with other media devices 102, media server 110, content database 104, product database 106, and merchant database 108. For example, data interface 218 may receive video content from content database 104, updated data parameter(s) from media server 110, and/or product information from product database 106. Data interface 218 may also receive data related to a viewer. For example, data interface 218 may receive transaction data regarding a viewer, internet browsing data of a viewer, instant messaging and email data of a viewer, social media data of a viewer, and the like. Data interface 218 may also send data from media device 102 to other devices, servers, databases, etc.

Shopping cart module 220 may be configured to populate a shopping cart based on products recognized from video content. For example, shopping cart module 220 may populate a shopping cart with products that are recognized from video frames over a predetermined time period. The predetermined time period may be the entire time duration of a video stream (e.g., the entire length of a movie or television show), or a selected portion of the video stream (e.g., minutes three through twelve of the video). Shopping cart module 220 may populate the shopping cart in real-time as video content is played and products are recognized. Shopping cart module 220 may also populate the shopping cart according to a delay as video content is played and products are recognized. Tile delay may be related to a time needed to process tile video content for product recognition. Shopping cart module 220 may also pre-populate the shopping cart with products that have previously been recognized from the video content by a media device 102 or a media server 110.

Shopping cart module 220 may be populated with one or more products that are recognized from video frames. For example, based on a viewer's transaction data regarding previously purchased products, internet web-browsing history, social media data, email and instant messaging data, and the like, certain recommended products that are recognized in video frames may be populated in the shopping cart by shopping cart module 220. Such recommended products may be set for a plurality of viewers. For example, viewers may have personalized shopping cart profiles generated for them by shopping cart module 220. Such profiles utilize data specific to individual viewers, and may be based on transaction data, internet web-browsing history, social media data, email/instant messaging conversation data, products previously recognized in other video and/or image content, and the like. Thus, shopping cart module 220 may determine that certain recognized products in video content should be populated in a first shopping cart of a first viewer, and certain other products should be populated in a second shopping cart of a second viewer. A viewer may adjust a viewer profile. For example, a viewer may adjust which products Ile is interested in regardless of transaction data, internet web-browsing history, social media data, email/instant messaging conversation data, and the like. Moreover, a viewer may adjust a price range of products he is interested in, brands a viewer is interested in, product types a viewer is interested in, and the like.

Shopping cart module 220 may also determine which products should be populated in a shopping cart by analyzing content viewing history of a viewer. For example, a viewer may be a fan of movies that feature characters who use futuristic electronic gadgets and wear designer clothing, and the viewer may have a content viewing history of viewing such movies. Thus, when products and items related to electronic gadgets and designer clothing are recognized in video/image content, such items may be populated in a shopping cart for tile viewer.

Shopping cart module 220 may prioritize products that have been recognized and populated in the shopping cart by ranking the products in certain positions on the list. The prioritization may be based on a determined interest level of the viewer in the recognized product. For example, while a viewer may be interested in multiple products that are recognized, the viewer may prioritize a first product higher than a second product for purchasing. Shopping module 220 may determine an interest level of the viewer in recognized products in a shopping cart by analyzing the viewers' transaction data, internet web-browsing history, social media data, and the like.

Shopping cart module 220 may process data collected from product database 106 and/or merchant database 108 that is related to a recognized product. Shopping cart module may aggregate collected data from product database 106 and/or merchant database 108, and may include a subset of tile aggregated data with the product in tile shopping cart. The subset of data may include descriptive data about the product, such as price, information, brand, merchants, availability, and the like.

In one example, a viewer may have made several purchases at a shoe store for a specific brand of men's sneakers. The internet web-browsing history for this viewer may indicate that the viewer has visited a number of shoe vendor websites, and the social media data for this viewer may indicate that the viewer has "liked" a social media page of the specific brand. Thus, shopping cart module 220 may determine that a recommended product for the viewer is a men's sneaker made by the specific brand. Thus, when video content is analyzed by recognition engine 202, and analysis module 210 recognizes a men's sneaker made by the specific brand, a shopping cart for the viewer may be populated with the sneaker by shopping cart module 220. Shopping cart module 220 may process data collected from product database 106 and/or merchant database 108 that is related to the sneaker. For example, shopping cart module 220 may process the collected data from product database 106 and/or merchant database 108 to determine website vendors and brick and mortar stores that sell the sneakers and/or have the sneakers in stock, information about the sneakers (e.g., where they are made, reviews, how they fit, recommended sizing, etc.), and how much they cost. Shopping cart module 220 may personalize the product that is placed in the shopping cart. For example, data regarding the viewer's size, color preferences, and the like, related to the product, may be determined for the viewer from one or more of the transaction data, internet browsing history, social media data, and/or other collected data of the viewer. In the current example, one or more shoe sizes of previous shoes purchased by the viewer may be determined from previous transaction data, and color preferences of the viewer may be determined from the previous transaction data. Thus, shopping cart module 220 may recommend that the viewer purchase the shoe in the shopping cart in a specific shoe size (or shoe size range) and color from such data.

Shopping cart module 220 may also recommend one or more other products that a viewer may be interest in based on the viewer's transaction data regarding previously purchased products, internet web-browsing history, social media data, email/instant messaging conversation data, and the like. For example, while a certain type of shoe may be recognized from video content and populated in a shopping cart for the viewer, shopping cart module 220 may recommend similar kinds of the products or different variations of the product to the viewer.

Viewers may purchase items directly from the shopping cart via shopping module 220. For example, a viewer may interact with shopping module 220 via a user interface displayed on the same display as the video content, and may confirm that they wish to purchase the product directly from the shopping cart. Alternatively, when a viewer wishes to purchase a product in the shopping cart, the viewer may be directed to a third party vendor website to purchase the product. Purchases may be made in real-time as a viewer is watching content, or a viewer may save a product in the shopping cart to purchase at a later time. A shopping cart may be accessible from a multitude of external user devices at a later time or while content is being streamed/played. Purchasing may be made via stored purchase credentials of the viewer (or somebody else), or by a user inputting payment information and credentials into a media device via communication interface 218. User input for purchasing may be made via inputs made on an external user device.

Shopping cart module 220 may be configured to communicate via communication interface 216 to an external user device. For example, via communication interface 216, shopping cart module 220 may communicate shopping cart information to an external user device. The external user device may then display the shopping cart on the external user device. The shopping cart may be displayed and populated while video content is streamed or played. The shopping cart may be pre-populated as previously discussed. Shopping cart module 220 may also interact with one or more advertisement servers that contain advertisement content. For example, based on the recognized products that populate a shopping cart, advertisements for such products that are in the shopping cart, or related products, may be provided to media device 102 for display to the viewer. The viewer's transaction data, internet web-browsing history, social media data, email/instant messaging conversation data, and the like may also be used by shopping cart module 220 to determine advertisements that a viewer may be interested in, and that should be displayed to the viewer. Advertisements that are collected may be displayed during advertisement display periods that occur before content is viewed, after content is viewed, or in advertisement segments that are determined to occur during content streaming (i.e., commercial breaks during content streaming).

Shopping cart module 220 may link the product to one or more merchants who sell the product. A viewer may then select the link to view the product at the merchant's website. The one or more merchants may be determined via merchant database 108. The one or more merchants may be selected as preferred merchants who are preferentially linked to a shopping cart by shopping cart module 220. A preferred merchant may be determined based on one or more of a revenue generation agreement that specifies how a content provider or other entity operating media device 102 or media server i 10 benefits from purchases or visits made by a viewer at a certain merchant, a referral agreement between a merchant and the content provider or other entity operating media device 102 or media server 110, an availability of the product or product inventory, and a price of the product, for example. If a product that that is placed in a shopping cart does not have any associated advertisements, then the linking to merchant website may provide a determination as to advertisement demand based on the traffic of a viewer to a merchant's web site, and provide a determination that an advertisement should be created for the product because there is demand to purchase such product.

Figure 3:
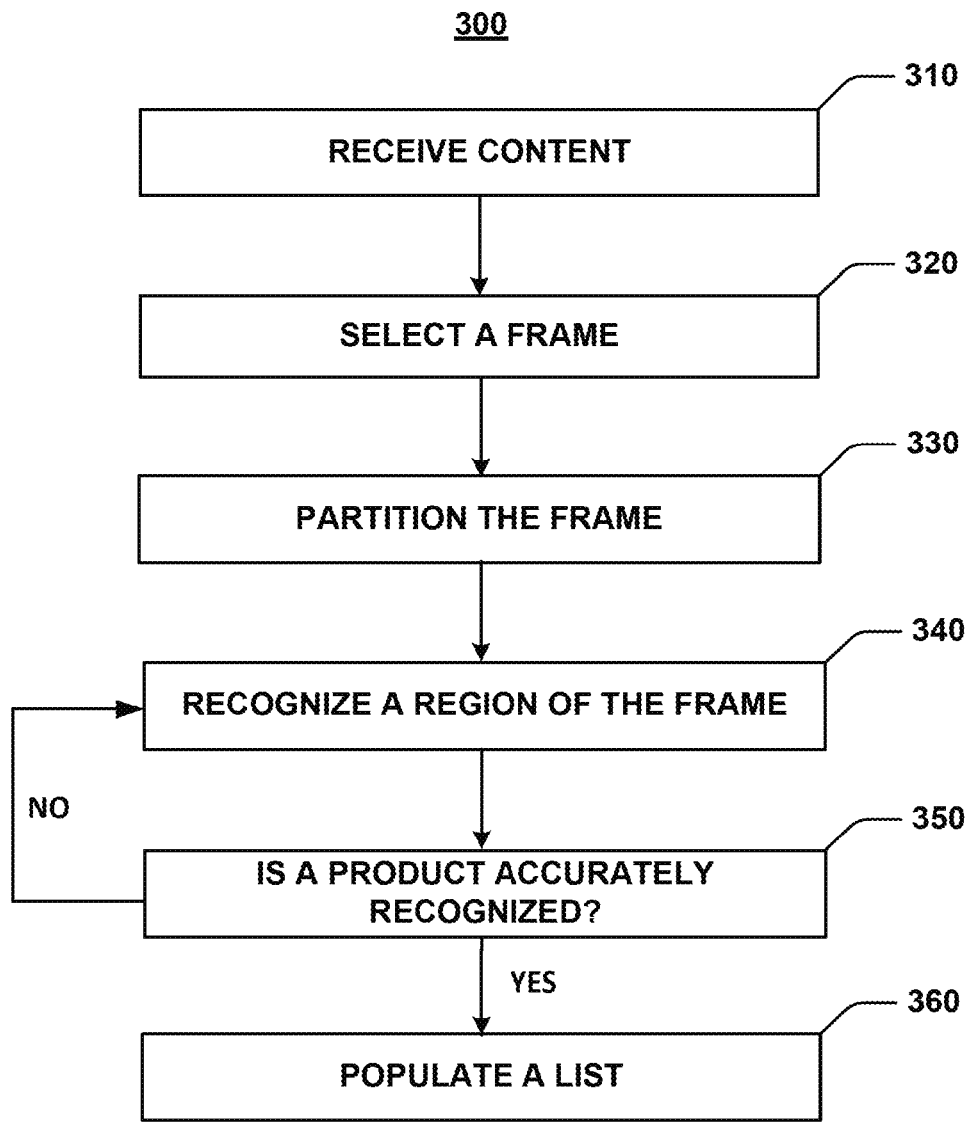
FIG. 3 is a flowchart of an automated object recognition method, consistent with disclosed embodiments.

FIG. 3 is a flowchart of an automated object recognition method 300 consistent with disclosed embodiments. For example, method 300 may be performed by media device 102 and/or media server 110 to recognize products in video and/or image content, and thereafter add one or more recognized products to a digital shopping cart. While the following description presumes method 300 is performed by media device 102, some or all of the steps of method 300 may also be performed by media server 110, which then sends the result of the product recognition to a media device 102 for viewing by a viewer.

In step 310, media device 102 (or media server 110) receives content. The content may be video content or image content received from content database 104. For example, the content may be a video stream including one or more video frames. As another example, the content may be image content including images from a website, photo album, Internet image gallery, and the like.

In step 320, frame selection module 206 selects a frame of the received content. For image content, an image frame is selected. For video content, one or more video frames of a video stream may be selected. For example, as discussed above, frame selection module 206 of a media device 102 may select one or more video frames from a plurality of video frames in a video stream according to a frame selection rate. The frame selection rate may determine how often a video frame in a video stream is selected for product recognition analysis. For example, the frame selection rate may specify that frame selection module 206 should select every video frame of the video stream for recognition analysis, every other frame for recognition analysis, one out of every three frames for recognition analysis, one out of every fifty frames for recognition analysis, one out of every one-hundred frames, and so on. Frame selection module 206 may change the frame selection rate according to viewer input or based on a determination of media device 102 and/or media server 110 about whether the product recognition is accurate.

In step 330, partition module 208 partitions a frame of the received content. For example, as discussed above, partition module 208 may partition an input video or image frame into a number of image blocks that contain a number of pixels, respectively. For example, partition module 208 may partition a video frame into a plurality of image blocks. The plurality of image blocks may be sized at a variety of different sizes, such as 16×16 pixels, 32×32 pixels, 32×i 6 pixels, and the like. The partitions may be any size known in the art. Alternatively, partition module 208 may not partition the video frame but may treat the entire frame as one image block. Partition module 208 may adjust the partitions of video frames. The adjustments may be applied to all video frames, certain video frames, certain types of content, certain content formats and definitions, and the like.

In step 340, analysis module 210 recognizes a first region of a video frame using at least one machine-learning algorithm. The first region may include a single image block or a plurality of image blocks. The first region may correspond to an area of a video frame where a product may be located. The first region may be recognized as discussed above.

In step 350, analysis module 210 determines whether a product is accurately recognized from the first region. Specifically, analysis module 210 may determine a first likelihood metric of image block(s) that are present in the first region, and compare the first likelihood metric to a predetermined threshold. Analysis module 210 may determine the first likelihood metric based on information, such as product information and merchant information, determined about the potential product in the first region, and an error rate of the image recognition algorithms. Analysis module 210 may also determine the first likelihood metric based on the frame selection rate.

If the first likelihood metric is greater than or equal to a predetermined threshold, then analysis module 210 deem the product to be accurately recognized, and method 300 may continue to step 360. However, if the first likelihood metric is less than the predetermined threshold, then further analysis is needed to recognize the product, and method 300 returns to step 340 for further recognition of a frame region. The further recognition of a region of the frame at step 340 may include recognizing a section within the first region of the frame and determining a second likelihood metric, or recognizing a different region of a frame that was not previously recognized during the first iteration at step 340.

Alternatively, threshold analysis with the first likelihood metric may not be performed after the first region is recognized. Instead, analysis module 210 may repeat step 340 a predetermined number of times to refine accuracy of a recognized frame region. For example, a first region may be identified. Then, a section may be identified inside the first region, where the section may be a smaller region of image blocks containing a product compared to the first region. The section may not contain other products, items, or elements that are present in the video frame because the section may only include image blocks that correspond to a product in the video frame.

Analysis module 210 may recognize a region containing a first product in a video frame through an iterative process. For example, in step 340, analysis module 210 may recognize a first region that includes a first product and a second product. The first product may be a wrist watch on a person's right wrist, and the second product may be a cell phone in the person's right hand. While analysis module 210 may determine that these products are located in the first region, the accuracy of recognizing the products to determine information about the products (such as brand, model, etc.) may be determined as too low for accurate product recognition in step 350, and the locations of the products within the first region may not be accurately determined. Thus, step 340 may be repeated. In repeated step 340, analysis module 210 may recognize one or more sections within the first region by determining refined locations of the first and second products. For example, analysis module 210 may determine that the first product wrist watch is located in a section of the first region, and is located on a person's right wrist This determination may be more accurate than the processing that determined the first region because rather than processing the entire video frame to determine the watch's location, only the first region of the video frame (which is a smaller region than the entire video frame) may be analyzed. Analysis module 210 may determine that the right wrist of the person is associated with a right hand (and vice versa) via learning of other video content and/or parameters of at least one machine-learning algorithm. For example, the learning may be provided via analysis of other video content that shows a product being held in a person's hand. Thus, analysis module 210 may then focus analysis for recognition of the second product in a region near the first product's location (e.g., in a region that corresponds to the person's right hand) because a probability of a second product being located in this section of the first region may be higher relative to probabilities of a product being in other sections of the first region. The section containing a second product may therefore be recognized based on a section containing the first product.

In step 360, shopping cart module 220 may populate a list with the identified product and display information identifying the product in the list The displaying may include displaying the information in a digital shopping cart that is populated with the recognized product. For example, shopping cart module 220 may be configured to populate a digital shopping cart based on products recognized in video content.

Figure 4A:
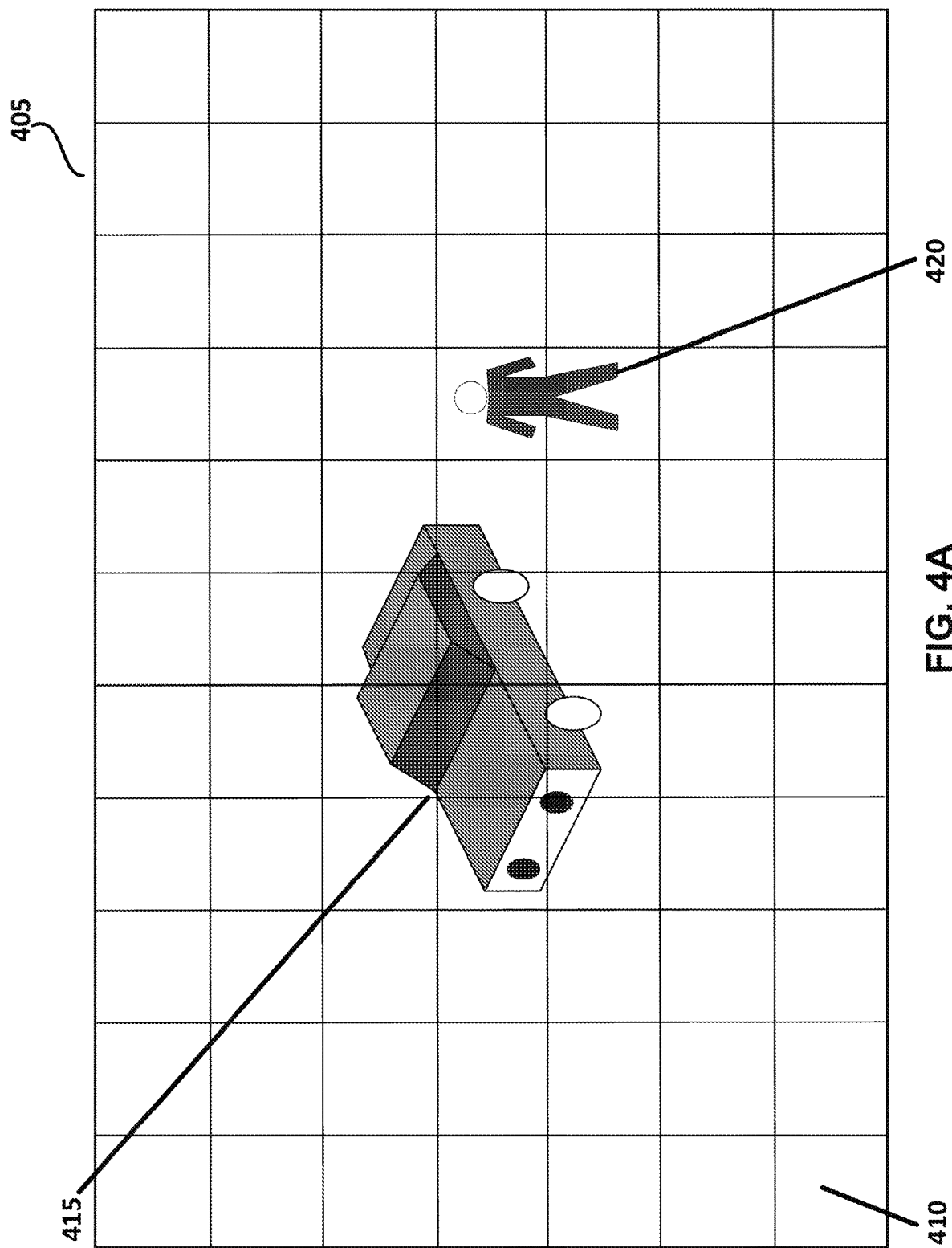
FIG. 4A is a schematic diagram of a video frame consistent with disclosed embodiments.
Figure 4B:
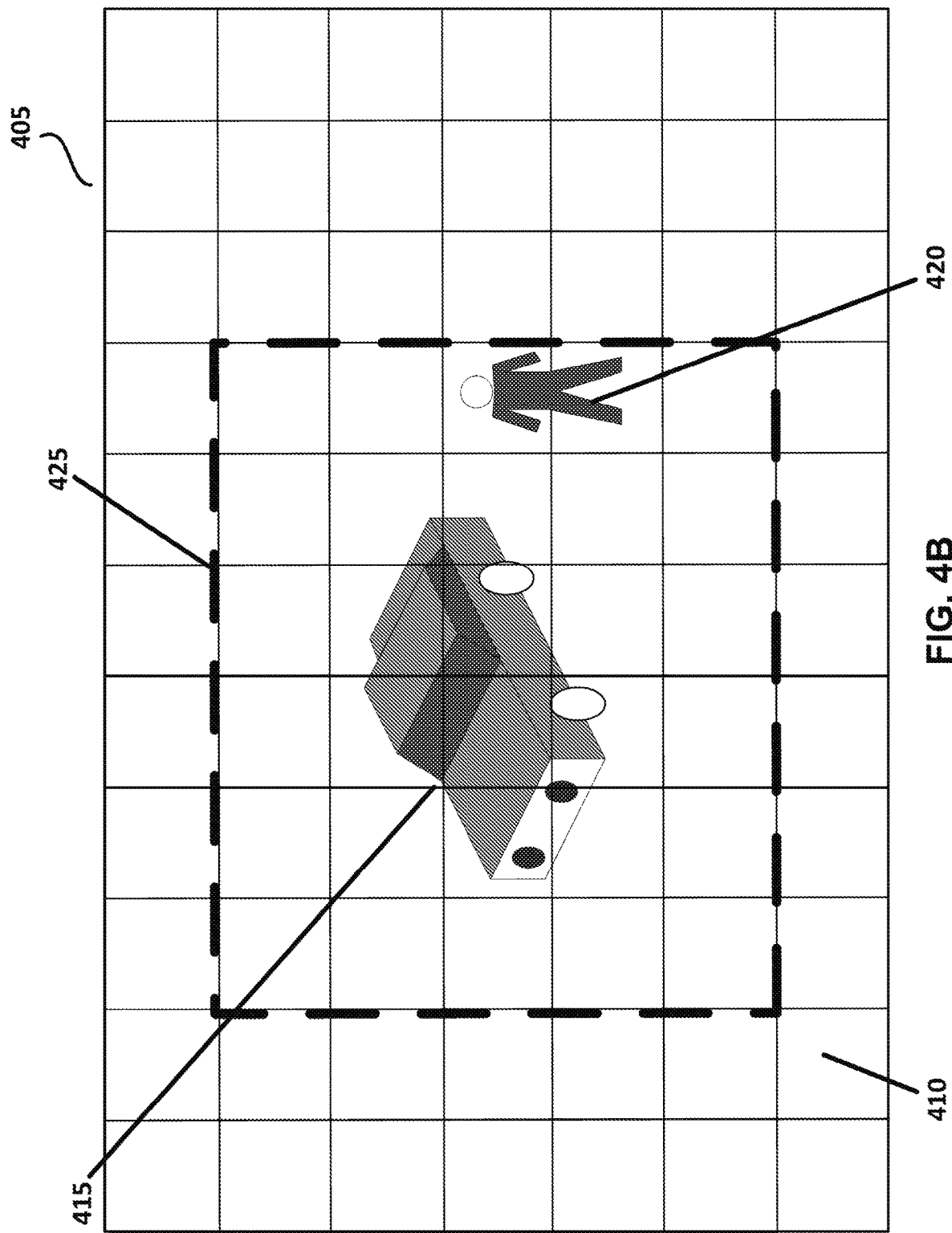
FIG. 4B is a schematic diagram of a video frame consistent with disclosed embodiments.
Figure 4C:
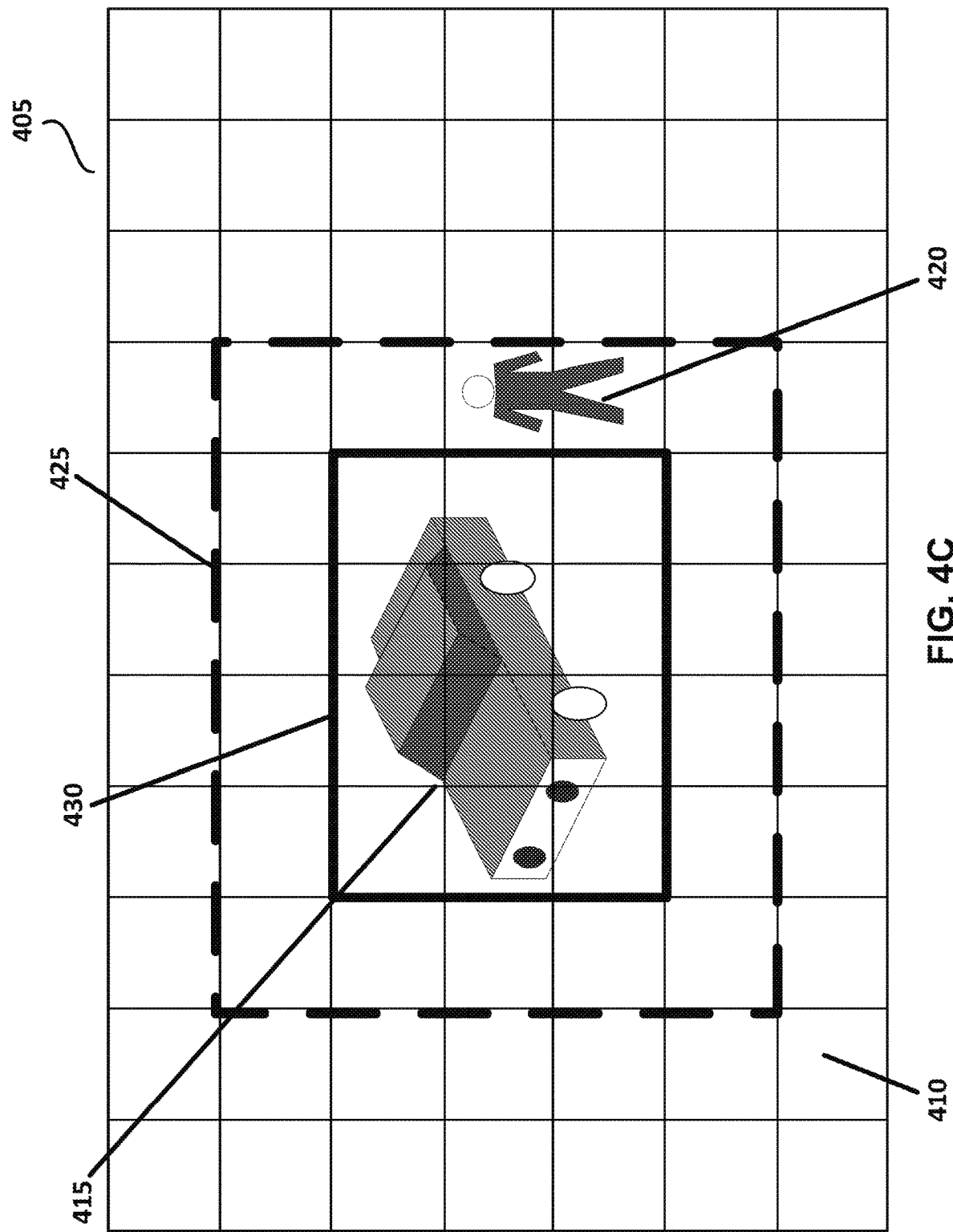
FIG. 4C is a schematic diagram of a video frame consistent with disclosed embodiments.

FIGS. 4A through 4C show an exemplary video frame 405, and illustrate the processes that media device 102 and/or media server 110 perform to recognize a product in a video frame.

FIG. 4A is a schematic diagram of a video frame 405 consistent with disclosed embodiments. Video frame 405 may be a video frame of a video stream received by media device 102 and/or media server 110 from content database 104. Media device 102 and/or media server 110 may partition video frame 405 into one or more image blocks 410. As discussed above, each image blocks 410 may include a specified number of pixels. Video frame 405 may include a number of items. For example, video frame 405 may include a car 415 and a person 420. Person 420 may be wearing a certain kind of clothing, clothing of a certain color, clothing of a certain brand, and the like.

FIG. 4B is a schematic diagram of video frame 405 consistent with disclosed embodiments where a first region 425 is recognized. A first region may include all, some, or only one of a product or item located in a video frame. In video frame 405, first region 425 includes both car 415 and person 420. As discussed above, media device 102 and/or media server 110 may use at least one machine-learning algorithm to recognize regions of a video frame, such as a first region 425. Media device 102 and/or media server 110 may then determine a first likelihood metric of the images blocks 410 present in first region 425 and compare the first likelihood metric to a predetermined threshold to determine whether a product can be recognized accurately from first region 425. As shown in FIG. 4B, the first region 425 is a subset region of video frame 405. Thus, media device 102 and/or media server 110 may focus on first region 425 to recognize car 415 and clothing worn by person 420, thereby saving the analysis on other regions of video frame 405. As such, the analysis to recognize car 415 and clothing worn by person 420 need not to be performed on entire video frame 405. This may help provide more efficient video processing and reduce processing overhead.

FIG. 4C is a schematic diagram of video frame 405 consistent with disclosed embodiments where a section 430 is recognized within first region 425. As shown by FIG. 4C, section 430 contains car 415, and does not include person 420. Section 430 may be determined by further processing of first region 425. For example, media device 102 and/or media server 110 may use at least one machine-learning algorithm utilizing at least one learned data parameter to recognize section 430 within first region 425. The machine-learning algorithm and/or parameter may be the same as that used to recognize first region 425, or may be different. If different, media device 102 and/or media server 110 may adjust the machine-learning algorithm and/or parameter based on one or more of the shapes, edges, colors, items, products, text, and any other characteristic of image blocks that are present in first region 425. Media device 102 and/or media server 110 may then determine a second likelihood metric of the images blocks 410 present in second region 425 and compare the second likelihood metric to a predetermined threshold to determine whether a product can be recognized accurately from section 430. The second likelihood metric may correspond to one or more of the image blocks that are present in section 430. If the second likelihood metric exceeds or meets the predetermined threshold, then media device 102 and/or media server 110 determines the one or more image blocks of section 430 as corresponding to a product. The recognized product may then be available for populating in a shopping cart.

FIG. 5 is a schematic diagram showing a frame selection rate consistent with disclosed embodiments. Referring to FIG. 5, a plurality of video frames 510-560 are shown. Each of video frames 510-560 may include video content that includes at least one product, and may be part of a video stream that includes more video frames. In some embodiments, analysis module 210 is not required to process each video frame to accurately recognize a product within the video content. Instead, analysis module 210 may only need to analyze one out of every four frames, one out of every two frames, or the like, to provide accurate product recognition. Thus, frame selection module 206 may determine a frame selection rate that indicates how often a frame of a video stream is selected for analysis by analysis module 210. Analyzing the selected frames rather than ail the video frames within the video content may reduce processing overhead and provide more efficient processing. For example, the frame selection rate may indicate that every other video frame of a video stream is analyzed by analysis module 210. Thus, in this case, frames 510, 530, and 550 may be analyzed, while frames 520, 540, and 560 need not to be analyzed. It should be noted that the frame selection rate may be set to analyze each frame in a video stream.

Figure 6A:
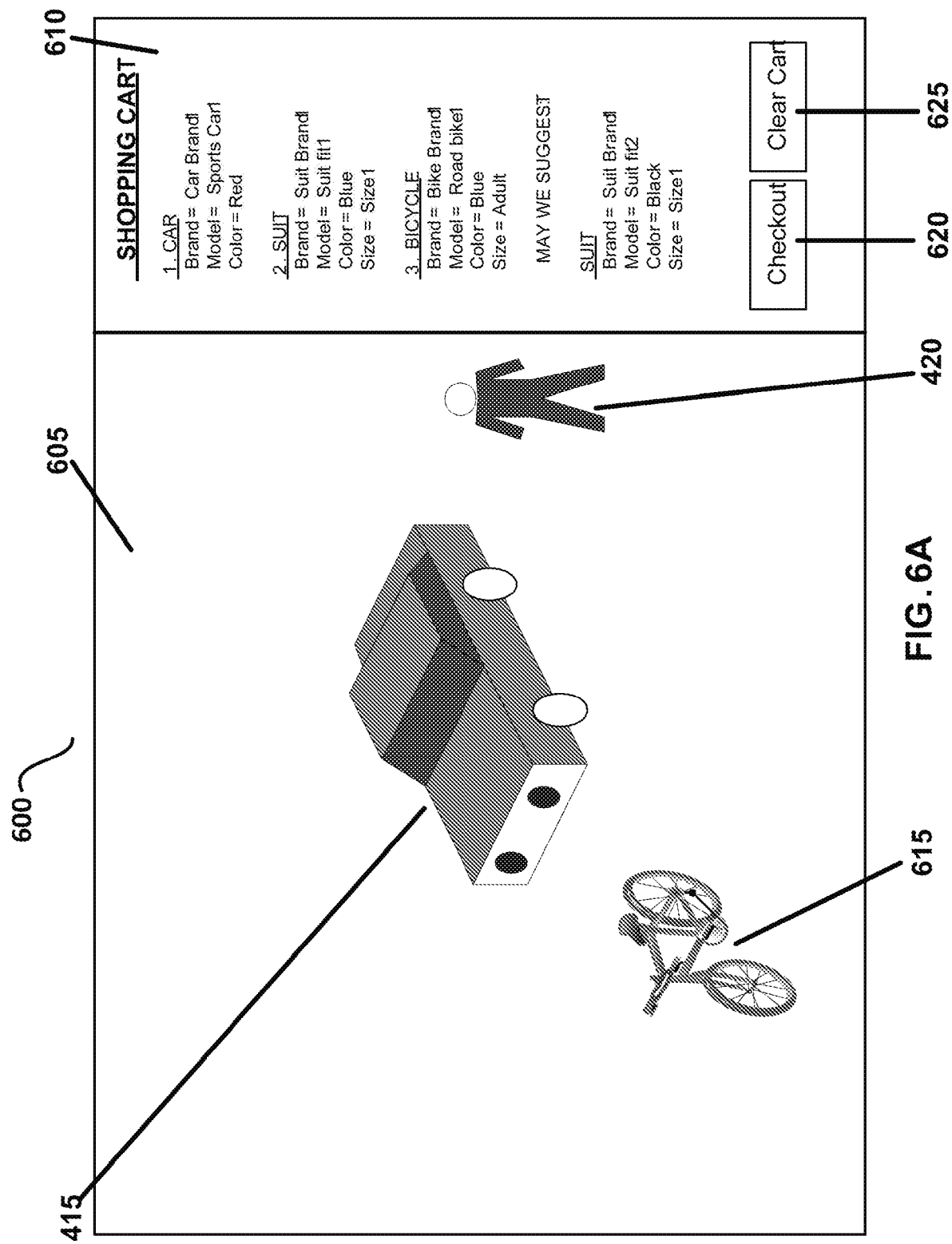
FIG. 6A is a schematic illustration of a graphical user interface, consistent with disclosed embodiments.

FIG. 6A is an illustration of a graphical user interface 600, consistent with disclosed embodiments. Interface 600 may be an example of what is seen by a viewer on a display of a media device 102 or a display connected to media device 102. Interface 600 may include a content region 605 and a shopping cart region 610. Content region 605 may display video and/or image content. In FIG. 6A, content region 605 includes car 415, person 420, and bicycle 615.

A shopping cart 610 may be provided as an overlay graphic that overlays content 605 as content 605 is displayed and/or streamed. Shopping cart 610 may be transparent, and when shopping cart 610 overlays content 605, content 605 displayed behind shopping cart 610 may still be viewable. Alternatively, shopping cart 610 may be opaque, and when shopping cart 610 overlays content 605, content 605 displayed behind shopping cart 610 may be obscured from a viewer. Shopping cart 610 may fade into and out of view on interface 600. For example, shopping cart 610 may fade into view from being non-visible. Also, when shopping cart 610 is initially visible, shopping cart 610 may fade out of view and eventually disappear.

Shopping cart 610 may alternatively be provided on a side of content 605 and not overlaying content 605. For example, shopping cart 610 may be displayed to the left, right, above, or below content 605 so as to not overlay content 605.

Shopping cart 610 may appear as each product in a video and/or image stream is recognized, or when certain products are recognized. Alternatively, shopping cart 610 may appear at a predetermined interval, such as every five minutes or every ten minutes, for example, during streaming or viewing of content. Alternatively, shopping cart 610 may always be visible. Alternatively, shopping cart 610 may appear when prompted by a user. For example, shopping cart 610 may appear as a result of user input into media device 102 via communication interface 216.

Shopping cart 610 may include descriptions of recognized products. For example, as shown in FIG. 6, shopping cart 610 may include descriptions of the recognized car 415, suit on person 420, and bicycle 615. The descriptions may be collected from product database 106 and/or merchant database 108. Further descriptions other than those shown in FIG. 6 may be displayed by shopping cart 610. For example, vendors (including online vendors and brick and mortar vendors), product availability, and alternate sizes/colors, for example, may be displayed for each recognized product.

Shopping cart 610 may also include recommendations based on products that have been recognized. For example, shopping cart 610 may display a recommendation for one or more products that a viewer may be interested in. As discussed, the recommendations may also be based on a viewer's transaction data regarding previously purchased products, internet web-browsing history, social media data, email/instant messaging conversation data, and the like. For example, as shown in FIG. 6, shopping cart 610 includes a recommendation for a suit of the same brand as the suit recognized in content 605, but with a different model and a different color from the suit recognized in content 605.

Shopping cart 610 may also include one or more selection icons. For example, in shopping cart 610, a selection icon 620 is provided for checking out and completing a purchase of products that are located in shopping cart 610, and a selection icon 625 is provided for clearing all (or some) of the recognized products from shopping cart 610. Viewer activation of selection icon 620 may direct a viewer to a third party website for purchasing one or more of the products in shopping cart 610, or may allow a viewer to directly purchase one or more of the products in shopping cart 610. Shopping cart 610 may allow a user to purchase products that are populated in shopping cart 610 in real time as content is streaming/playing, and may provide an option for purchasing in response to a displayed product Shopping cart 610 may be displayed on an external user device, such as via an application program on the external user device, to allow a viewer to shop in real time via the external user device.

Figure 6B:
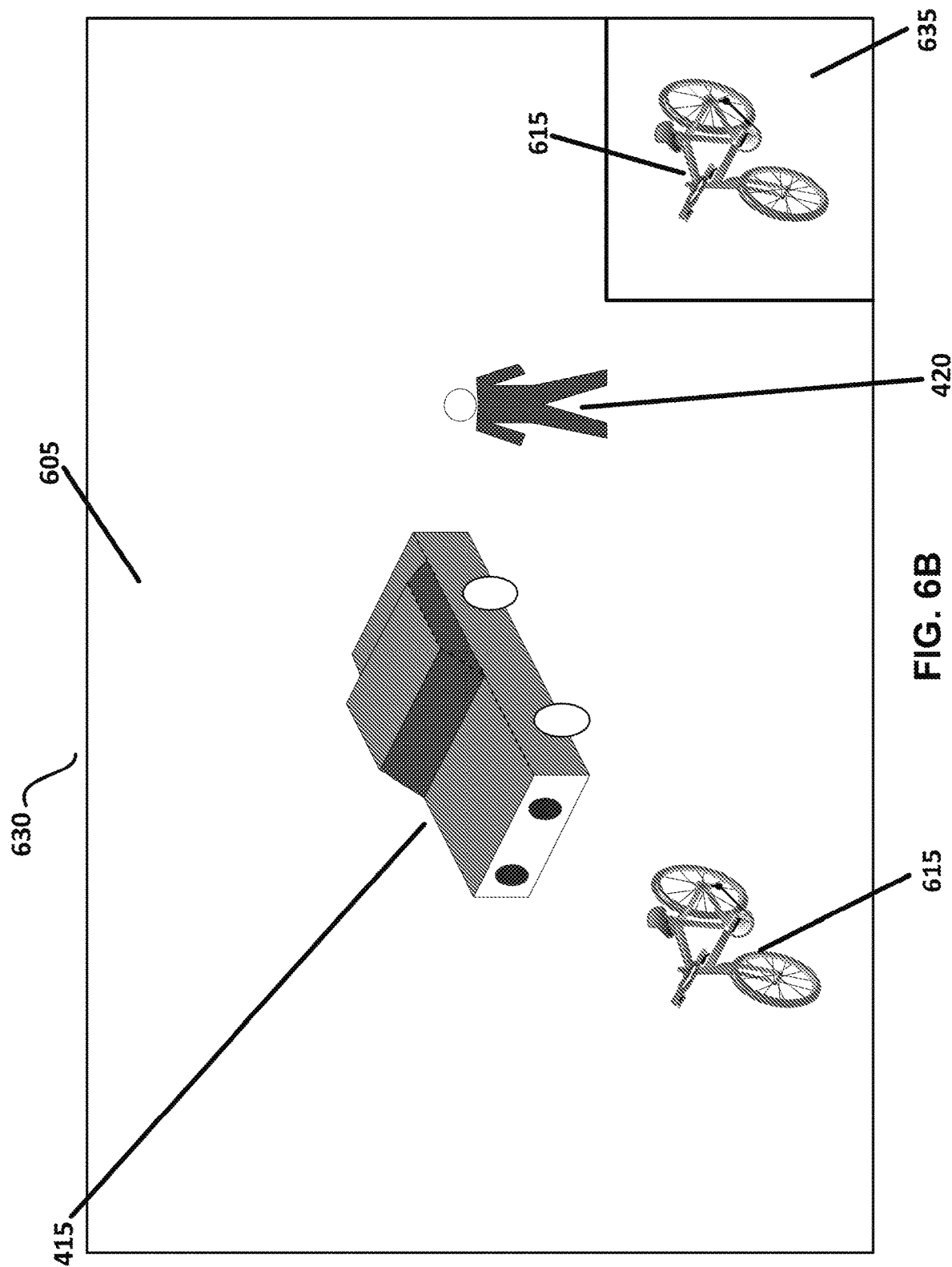
FIG. 6B is a schematic illustration of a graphical user interface, consistent with disclosed embodiments.

FIG. 6B is an illustration of a graphical user interface 630, consistent with disclosed embodiments. Interface 630 may be an example of what is seen by a viewer on a display of a media device 102 or a display connected to media device 102. Interface 630 may include a content region 605 and a widget region 635. Content region 605 may display video and/or image content. In FIG. 6B, content region 605 includes car 415, person 420, and bicycle 615. Widget region 635 may display each product in a video stream in real time as the product is recognized or after the product is recognized. In FIG. 6B, bicycle 615 is located in a "widget" region 635, indicating that bicycle 615 has been recognized. Widget region 635 may be located in any portion of interface 630, and may be moveable by a viewer (via input into media device 102). Widget region 635 may also move automatically to areas of content region 605 that do not feature products, movement, people, or the like. Widget region may be selectable by a viewer. For example, if a viewer selects widget region 635 (for example, by a click, selection, or any other input) a shopping cart (e.g., shopping cart 610) may be displayed in interface 630, a viewer may be directed to a merchant who sells bicycle 615, or a viewer may be directed to a website that includes product information about bicycle 615.

Widget region 635 may be provided as an overlay graphic that overlays content 605 as content 605 is displayed and/or streamed. Widget region 635 may be transparent, such that when Widget region 635 overlays content 605, content 605 displayed behind Widget region 635 may still be viewed. Alternatively, widget region 635 may be opaque, such that when widget region 635 overlays content 605, content 605 displayed behind widget region 635 may be obscured from a viewer. Widget region 635 may fade into and out of view on interface 600. For example, widget region 635 may fade into view from being non-visible. Also, when widget region 635 is initially visible, widget region 635 may fade out of view and eventually disappear.

Widget region 635 may alternatively be provided on a side of content 605 and not overlay content 605. For example, widget region 635 may be displayed to the left of, right of, above, or below content 605 so as to not overlay content 605.

Widget region 635 may appear as each product in a video and/or image stream is recognized. Alternatively, widget region 635 may appear on a predetermined basis, such as when certain products are recognized in a video and/or image stream, or every five minutes or every ten minutes, for example, during streaming or viewing of content. Alternatively, Widget region 635 may always be visible. Alternatively, Widget region 635 may appear when prompted by a user. For example, Widget region 635 may appear as a result of user input into media device 102 via communication interface 216.

Media device 102 and/or media server 110 may include a memory and a processor. Memory may be a volatile or non-volatile, magnetic, semiconductor, tape, optical, removable, non-removable, or other type of storage device or tangible (i.e., non-transitory) computer-readable medium that stores one or more program(s). The memory may store program instructions.

Program(s) consistent with one or more disclosed embodiments may include operating systems (not shown) that perform known operating system functions when executed by one or more processors. By way of example, the operating systems may include Microsoft Windows", Unix™, Linux™, Apple™ operating systems, or other types of operating systems. Accordingly, disclosed embodiments may operate and function with computer systems running any type of operating system. Mobile device 102 and/or media server 110 may also include communication software that, when executed by a processor, provides communications with network 112, such as Web browser software, tablet, or smart hand held device networking software, etc. In some embodiments, programs may include basic operating logic for performing functions.

A processor may be one or more known processing devices, such as a single- or multiple-core processor that executes parallel processes simultaneously. For example, a processor may be a single core processor configured with virtual processing technologies. In certain embodiments, a processor may use logical processors to simultaneously execute and control multiple processes. A processor may implement virtual machine technologies, or other known technologies to provide the ability to execute, control, run, manipulate, store, etc. multiple software processes, applications, programs, etc. In another embodiment, a processor may include a multiple-core processor arrangement (e.g., dual core, quad core, etc.) configured to provide parallel processing functionalities to execute multiple processes simultaneously. One of ordinary skill in the art would understand that other types of processor arrangements could be implemented that provide for the capabilities disclosed herein.

Media device 102 and/or media server 110 may include one or more storage devices configured to store information used by a processor (or other components) to perform certain functions related to the disclosed embodiments. In one example, media device 102 and/or media server 110 may include memory that includes instructions to enable a processor to execute one or more applications, and any other type of application or software known to be available on computer systems. Alternatively or additionally, the instructions, application programs, etc., may be stored in an internal database or external storage (not shown), such as one or more database or memory accessible over network 112.

Databases discussed herein or other external storage may be a volatile or non-volatile, magnetic, semiconductor, tape, optical, removable, non-removable, or other type of storage device or tangible (i.e., non-transitory) computer-readable medium. Databases may be controlled by memory controller devices (e.g., server(s), etc.) or software, such as management systems, Microsoft SOL databases, SharePoint™ databases, Oracle™ databases, Sybase™ databases, or other databases.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java™ (see https://docs.oracle.com/javase/8/docs/technotes/guides/languagei), C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for providing an object list based on objects identified in a video stream, comprising:
   a memory storing instructions; and
   a processor configured to execute the stored instructions to:
   receive the video stream from a video source, the video stream comprising a first set of video frames;
   select one or more video frames from the first set of video frames according to a frame selection rate;
   partition the one or more selected video frames into one or more sets of image blocks, each set of image blocks corresponding to a respective video frame;
   identify, within the one or more sets of image blocks, regions comprising an image of one or more objects, based on a machine-learning algorithm for determining regions characterized by an image recognition parameter;
   calculate a likelihood metric that each of the identified regions correspond to the one or more objects;
   update the object list, over a predetermined period of time, with the one or more objects, wherein the object list is updated based on the likelihood metric; and
   display, on a display, information related to the object list.

2. The system of claim 1, wherein the processor is further configured to execute the stored instructions to apply the machine-learning algorithm to a second set of video frames.

3. The system of claim 1, wherein the object list appears at a predetermined interval during the video stream.

4. The system of claim 1, wherein calculating that each of the identified regions corresponds to the one or more objects comprises:
   comparing the likelihood metric to a predetermined threshold; and determining that the identified regions correspond to the one or more objects when the likelihood metric exceeds or equals the predetermined threshold.

5. The system of claim 1, wherein the processor is further configured to execute the stored instructions to adjust the frame selection rate in response to a user input.

6. The system of claim 1, wherein the processor is further configured to execute the stored instructions to determine the frame selection rate based on at least one of an image quality of the video stream, a location of the object in the one or more selected video frames, or a viewable angle of the object in the one or more selected video frames.

7. The system of claim 1, wherein the processor is further configured to execute the stored instructions to determine the likelihood metric based on the information identifying the object.

8. The system of claim 1, wherein the processor is further configured to execute the stored instructions to receive the information related to the one or more objects, wherein the information includes descriptions of the one or more objects.

9. The system of claim 8, wherein the description of the one or more objects includes information related to one or more of a price of the object, an availability of the object, or a location of the object.

10. The system of claim 1, wherein:
the processor is further configured to execute the stored instructions to display the video stream; and displaying the information identifying the object comprises displaying the object list overlayed atop of the displayed video stream.

11. A computer-implemented method for recognizing an object in a video stream, comprising:
receiving the video stream from a video source, the video stream comprising a first set of video frames;
selecting one or more video frames from the first set of video frames according to a frame selection rate;
partitioning the one or more selected video frames into one or more sets of image blocks, each set of image blocks corresponding to a respective video frame;
identifying, within the one or more sets of image blocks, regions comprising an image of one or more objects, based on a machine-learning algorithm for determining regions characterized by an image recognition parameter;
calculating a likelihood metric that each of the identified regions correspond to the one or more objects;
updating an object list, over a predetermined period of time, with the one or more objects, wherein the object list is updated based on the likelihood metric; and
displaying, on a display, information related to the object list.

12. The computer-implemented method of claim 11, wherein a processor is further configured to execute stored instructions to apply the machine-learning algorithm to a second set of video frames.

13. The computer-implemented method of claim 11, wherein the object list appears at a predetermined interval during the video stream.

14. The computer-implemented method of claim 11, wherein a processor is further configured to execute stored instructions to adjust the frame selection rate in response to a user input.

15. The computer-implemented method of claim 11, wherein calculating that each of the identified regions corresponds to the one or more objects comprises:
comparing the likelihood metric to a predetermined threshold; and
determining that the identified regions correspond to the one or more objects when the likelihood metric exceeds or equals the predetermined threshold.

16. The computer-implemented method of claim 15, further comprising adjusting the frame selection rate when the likelihood metric is less than the predetermined threshold.

17. The computer-implemented method of claim 11, further comprising determining the frame selection rate based on at least one of image quality of the video stream, a location of the first set of objects in the one or more selected video frames, or a viewable angle of a second set of objects in the one or more selected video frames.

18. The computer-implemented method of claim 11, wherein a processor is further configured to execute stored instructions to receive the information related to the one or more objects, wherein the information includes descriptions of the one or more objects.

19. A non-transitory computer-readable medium storing instructions which, when executed, cause at least one processor to perform operations for recognizing an object in a video stream, the operations comprising:
receiving the video stream from a video source, the video stream comprising a first set of video frames;
selecting one or more video frames from the first set of video frames according to a frame selection rate;
partitioning the one or more selected video frames into one or more sets of image blocks, each set of image blocks corresponding to a respective video frame;
identifying, within the one or more sets of image blocks, regions comprising an image of one or more objects, based on a machine-learning algorithm for determining regions characterized by an image recognition parameter;
calculating a likelihood metric that each of the identified regions correspond to the one or more objects;
updating an object list, over a predetermined period of time, with the one or more objects, wherein the object list is updated based on the likelihood metric; and
displaying, on a display, information related to the object list.

20. The non-transitory computer-readable medium of claim 19, wherein calculating that each of the identified regions corresponds to the one or more objects comprises:
comparing the likelihood metric to a predetermined threshold; and
determining that the identified regions correspond to the one or more objects when the likelihood metric exceeds or equals the predetermined threshold.

* * * * *